United States Patent
Sabban

(10) Patent No.: US 10,547,271 B2
(45) Date of Patent: Jan. 28, 2020

(54) SUPPORT PLATE FOR PHOTOVOLTAIC PANEL

(71) Applicant: SNC YAP, Saint Ouen (FR)

(72) Inventor: Ylan Gilles Sabban, Neuilly sur Seine (FR)

(73) Assignee: SNC YAP, Saint-Ouen (FR)

( * ) Notice: Subject to any disclaimer, the term of this patent is extended or adjusted under 35 U.S.C. 154(b) by 0 days.

(21) Appl. No.: 15/353,634

(22) Filed: Nov. 16, 2016

(65) Prior Publication Data

US 2017/0070183 A1    Mar. 9, 2017

Related U.S. Application Data

(63) Continuation of application No. PCT/FR2015/051233, filed on May 11, 2015.

(30) Foreign Application Priority Data

May 16, 2014 (FR) .................................. 14 54405

(51) Int. Cl.
*H02S 20/25*    (2014.01)
*F24S 25/67*    (2018.01)
(Continued)

(52) U.S. Cl.
CPC .............. *H02S 20/25* (2014.12); *F24S 25/67* (2018.05); *H02S 40/34* (2014.12);
(Continued)

(58) Field of Classification Search
CPC .......... H02S 20/25; H02S 40/34; H02S 20/23; H02S 30/10; F24J 2/5228; F24J 2/5258;
(Continued)

(56) References Cited

U.S. PATENT DOCUMENTS 3,021,927 A * 2/1962 McKee, Jr. ............. E04D 3/365
                                                      138/89
3,775,925 A * 12/1973 Fujita ....................... E04D 1/28
                                                      52/534
(Continued)

FOREIGN PATENT DOCUMENTS

DE    202010014168    2/2011
DE    102009048501    3/2011
(Continued)

OTHER PUBLICATIONS

International Search Report for International Application PCT/FR2015/051233, dated Sep. 15, 2015.

*Primary Examiner* — Basil S Katcheves
*Assistant Examiner* — Omar F Hijaz
(74) *Attorney, Agent, or Firm* — Burris Law, PLLC

(57) ABSTRACT

Support plate adapted for fitting into a photovoltaic panel and allowing the fixing and the integration of this panel onto a building roof, said plate comprising leaktight vertical overlap means, leaktight leteral fitting means adapted for cooperating with a neighboring plate, protruding studs for positioning the plate which are raised, characterized in that the plate comprises a central portion forming a hood which is deliminated by a front face designed to be arranged opposite the photovoltaic panel and a rear face, said hood comprising an aperture adapted for allowing the recovery of air interposed between the photovoltaic panel and the front face of the hood.

6 Claims, 3 Drawing Sheets

(51) Int. Cl.
*H02S 40/34* (2014.01)
*F24S 25/00* (2018.01)

(52) U.S. Cl.
CPC ......... *F24S 2025/018* (2018.05); *Y02B 10/12* (2013.01); *Y02E 10/47* (2013.01)

(58) Field of Classification Search
CPC ........ F24J 2/5262; Y02B 10/20; Y02B 10/12; Y02E 10/47
See application file for complete search history.

(56) References Cited

U.S. PATENT DOCUMENTS

| | | | | |
|---|---|---|---|---|
| 4,204,523 | A * | 5/1980 | Rothe | E04D 13/031 126/623 |
| 4,227,515 | A * | 10/1980 | Jacob | F24D 11/003 126/592 |
| 4,406,106 | A * | 9/1983 | Dinges | E04D 3/363 428/63 |
| 5,287,670 | A * | 2/1994 | Funaki | E04D 3/3608 52/478 |
| 6,178,703 | B1 * | 1/2001 | Noone | E04D 1/16 52/100 |
| 6,856,496 | B1 * | 2/2005 | Mucci | H01L 31/048 136/244 |
| 8,713,861 | B2 * | 5/2014 | Desloover | E04D 1/08 126/622 |
| 8,869,471 | B2 * | 10/2014 | Wildes | H01L 31/0422 52/173.3 |
| 2003/0154680 | A1 * | 8/2003 | Dinwoodie | H02S 20/23 52/519 |
| 2005/0005534 | A1 * | 1/2005 | Nomura | H02S 20/23 52/90.2 |
| 2008/0302030 | A1 * | 12/2008 | Stancel | H01L 31/02008 52/173.3 |
| 2009/0000222 | A1 * | 1/2009 | Kalkanoglu | E04D 1/20 52/173.3 |
| 2010/0281794 | A1 * | 11/2010 | Saillard | F24J 2/4612 52/173.3 |
| 2011/0162301 | A1 * | 7/2011 | Ueda | H01L 31/05 52/173.3 |
| 2013/0133270 | A1 * | 5/2013 | West | E04B 1/38 52/58 |
| 2014/0224303 | A1 * | 8/2014 | Herwig | H01L 31/0488 136/251 |
| 2014/0250815 | A1 * | 9/2014 | Vander Laan | E04D 1/34 52/520 |
| 2014/0352760 | A1 * | 12/2014 | Haynes | H02J 50/12 136/246 |
| 2014/0366464 | A1 * | 12/2014 | Rodrigues | H02S 40/32 52/173.3 |
| 2015/0089887 | A1 * | 4/2015 | Bellavia | E04D 1/34 52/173.3 |
| 2015/0288327 | A1 * | 10/2015 | Cherukupalli | H02S 30/10 136/251 |

FOREIGN PATENT DOCUMENTS

| | | | | |
|---|---|---|---|---|
| DE | 102011104303 | | 12/2012 | |
| EP | 1184526 | | 3/2002 | |
| EP | 2541162 | | 1/2013 | |
| EP | 2565341 | | 3/2013 | |
| FR | 2977009 | A1 * | 12/2012 | ............ E04D 3/32 |
| JP | S626047 | | 1/1987 | |
| JP | H0712868 | | 3/1995 | |
| JP | H10169131 | | 6/1998 | |
| JP | 2001173161 | | 6/2001 | |
| JP | 2002097754 | | 4/2002 | |
| JP | 2013145081 | | 7/2013 | |
| RU | 2006109537 | | 10/2007 | |

\* cited by examiner

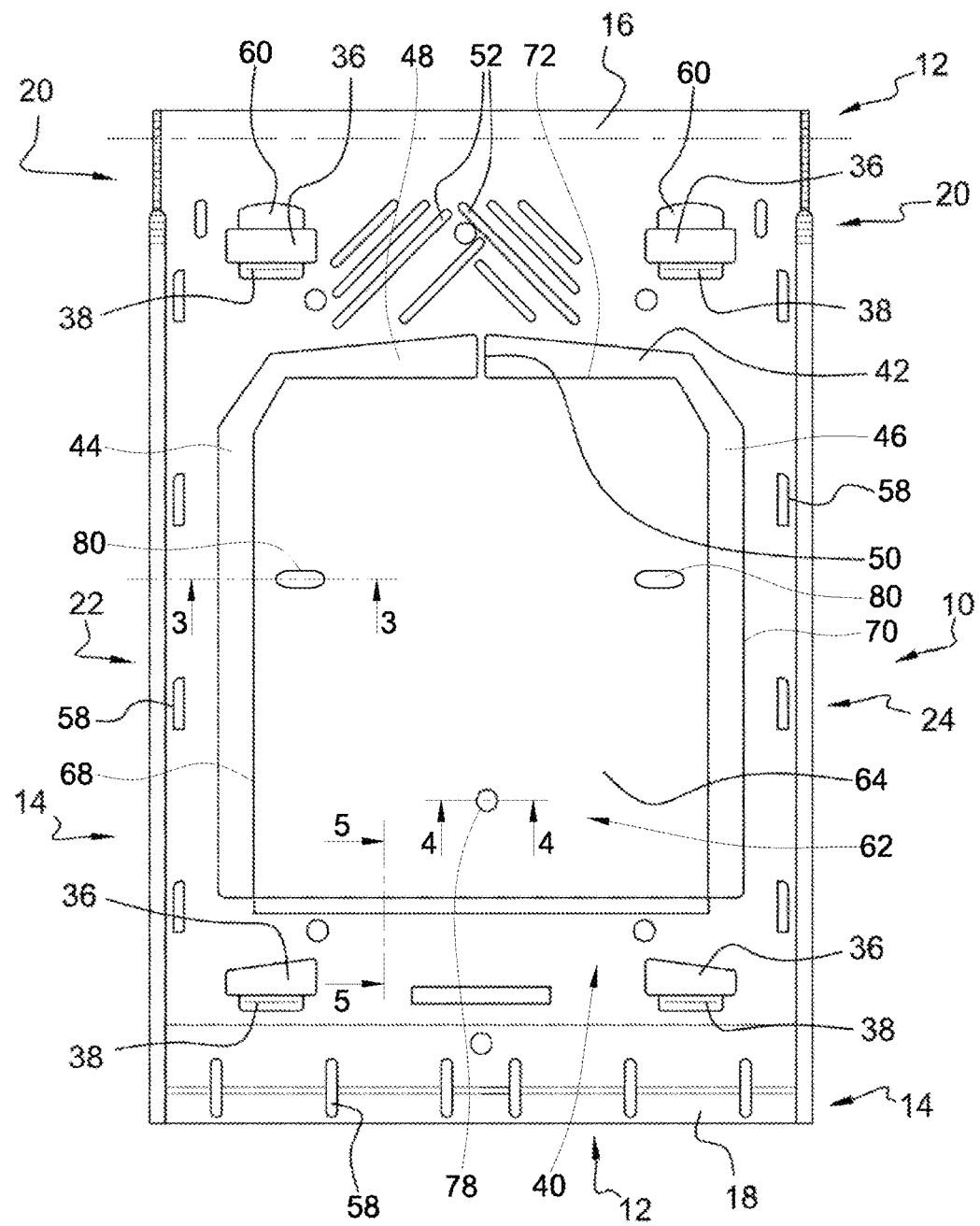
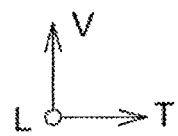

SUPPORT PLATE FOR PHOTOVOLTAIC PANEL

CROSS-REFERENCE TO RELATED APPLICATIONS

This application is a continuation of International Application No. PCT/FR2015/051233, filed on May 11, 2015, which claims the benefit of FR 14/54405, filed on May 16, 2014. The disclosures of the above applications are incorporated herein by reference.

FIELD

The present disclosure relates to a support plate for photovoltaic panel.

BACKGROUND

The statements in this section merely provide background information related to the present disclosure and may not constitute prior art.

The installation and the fastening of photovoltaic panels are traditionally performed using metallic rail systems which are heavy and require adapted means of transport.

Furthermore, the traditional systems are often exposed to the risk of water infiltration.

An installation device of photovoltaic panels described and shown in the document EP-A-2541162, which includes a thermoformed plate promoting the installation of the photovoltaic panels, is known.

This support plate is adapted to fit in a photovoltaic panel and to allow the fastening and the integration of this panel on a building roof. The plate comprises watertight vertical overlap means, watertight lateral interlocking means, fastening points of the plate, and a recess for the passage of the cables and the access to the framework of the roof.

SUMMARY

The present disclosure relates to a support plate adapted to fit in a photovoltaic panel and to allow the fastening and the integration of this panel on a building roof, said plate comprising:
 watertight vertical overlap means,
 watertight lateral interlocking means adapted to cooperate with an adjacent plate,
 positioning blocks of the plate which are raised, characterized in that the plate includes a central portion forming a cover which is delimited by a front face designed to be arranged opposite to the photovoltaic panel and by a rear face, said cover including a mouth adapted to allow the recovery of the air interposed between the photovoltaic panel and the front face of the cover.

Such a design allows recovering the heat dissipated by the photovoltaic panel, for example by sucking the hot air contained between the back of the photovoltaic panel and the cover through the mouth provided for this purpose.

Thus, the assembly constituted by the plate and the photovoltaic panel allows transforming the solar energy into electricity and heat which can be directly exploited by means of a ventilation device for example.

According to one form, the plate has a recess for the passage of the cables and the access to the framework of the roof, the cover being an insert adapted to obstruct said recess.

According to this form, the cover can be mounted on a preexisting plate.

In one form, the cover is adapted to be mounted by form-fitting interlocking on the plate.

This characteristic allows a simple and fast fastening of the cover on the associated plate.

According to another aspect, the mouth has a tubular shape which extends from the rear face of the cover and which is designed to be connected to an air extraction device.

Furthermore, the cover delimits at least one hole which is adapted for the passage of the cables.

Advantageously, the plate comprises a bead disposed so as to inhibit the flow of water coming from the ridge of the roof in the recess, the cover being arranged inside a perimeter delimited by said bead.

Also, the plate includes at least one reinforcement which is interposed between the lateral interlocking means and the roof and which is designed to inhibit the crushing of said interlocking means.

Furthermore, the plate includes a plurality of guide rails which are arranged upstream of the recess along the flow direction of the water coming from the ridge of the roof, and which are arranged in a generally inverted V shape in order to divert the flow of water on the lateral sides of the recess.

The present disclosure also concerns an assembly formed by a photovoltaic panel and a plate fitted in said photovoltaic panel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a top view which illustrates the support plate equipped with a cover for the heat recovery according to the present disclosure;

Figure 2:
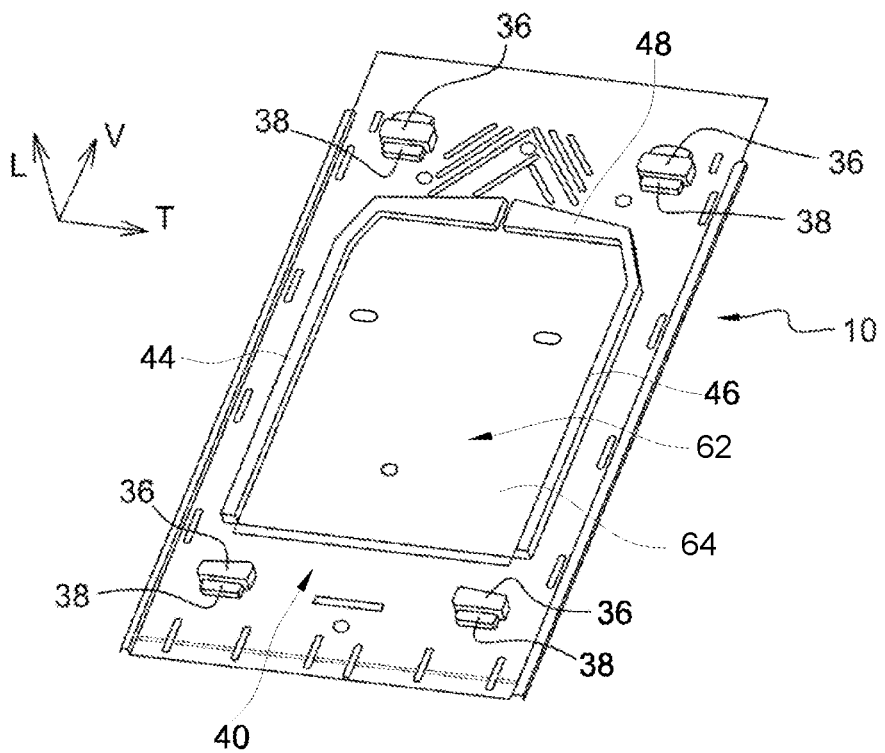
FIG. 2 is a perspective view which illustrates the support plate of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, we will use, in a non limiting manner, the expressions "upper," "lower" and their derivatives with reference, respectively, to the upper part and the lower part of FIG. 1.

Furthermore, in order to clarify the description and the claims, we will adopt, in a non limiting manner, the longitudinal, vertical and transverse terminology with reference to the trihedron L, V, T indicated in the figures, the vertical axis V being considered herein parallel to the slope of the roof, without reference to the earth gravity.

Of all of these figures, identical or similar references show identical or similar members or sets of members.

It is noted that, in the present patent application, the terms "upstream" and "downstream" should be understood relative to the slope of the roof on which the plate is intended to be mounted and to the direction of the flow of the runoff water.

There is shown in FIG. 1 a support plate 10 adapted to fit in a photovoltaic panel (not shown) and to allow the fastening and the integration of this panel on a building roof.

The plate 10 includes watertight vertical overlap means 12 and watertight lateral interlocking means 14.

The vertical overlap means 12 are formed by an upper transverse band 16 and by a lower transverse band 18 which are adapted to allow the overlap of an upper support plate and a lower support plate which are vertically juxtaposed.

According to this configuration, the lower band 18 of the upper plate 10 covers the upper band 16 of the lower plate 10 so as to provide watertightness.

For this purpose, the overlap means are provided with a graduation 20 which is designed to adjust the vertical overlap and the covering between two juxtaposed plates.

To this end, the graduation 20 represents a graduated measuring scale for example, which is engraved, printed or molded onto the upper band 16 of the support plate 10.

Thus, the graduation 20 allows measuring the overlap of two support plates 10 and guaranteeing a minimum covering and a good watertightness.

Furthermore, the graduation 20 allows setting the overlap of two juxtaposed support plates 10 depending on the size of the photovoltaic panel to be installed, so that the support plates can be adapted to different formats of photovoltaic panels.

Figure 7:
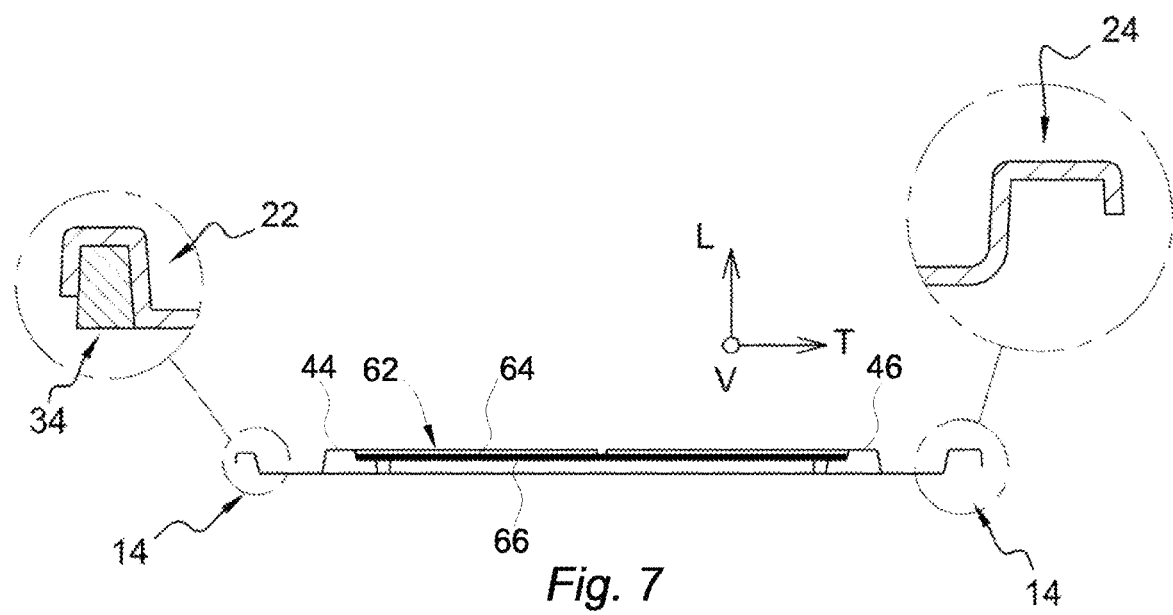
FIG. 7 is a side view which illustrates the watertight lateral interlocking means of the support plate.

As can be seen in FIG. 7, the lateral interlocking means 14 comprise a first profile 22 and a second profile 24 each extending vertically on the sides of the plate 10 and each having a hollow section in a generally inverted U shape.

The first profile 22 has a shape adapted to be fitted into the cavity formed by the second profile 24, when two adjacent support plates 10 are transversely juxtaposed, in order to ensure a good watertightness between the plates.

Figure 8:
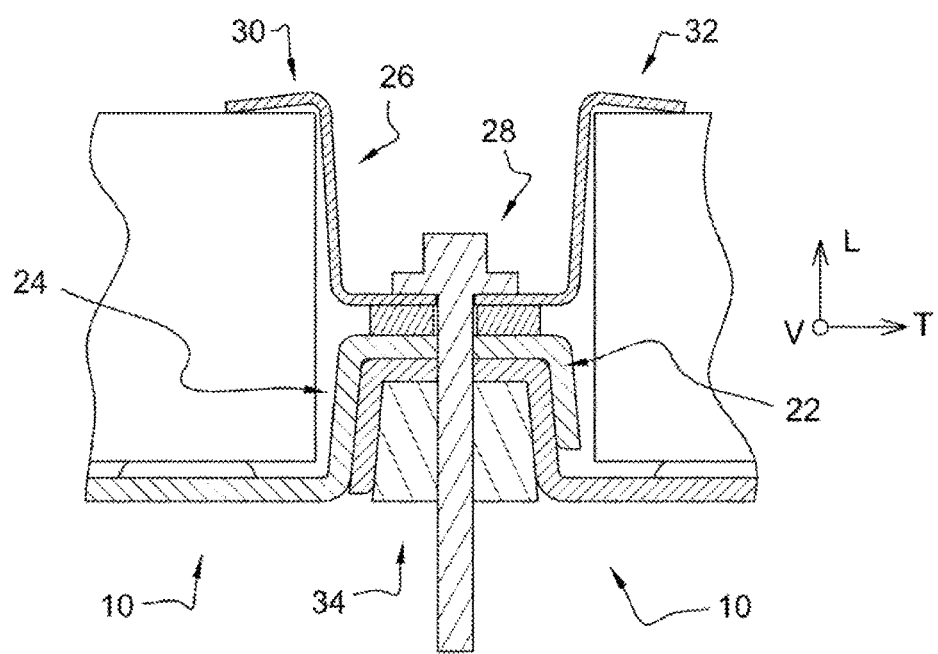
FIG. 8 is a cross-sectional detail view, which illustrates a reinforcement of the lateral interlocking means.

According to FIG. 8, a staple 26 is fastened to the profiles 22, 24 by means of a screw 28.

The staple 26 includes a first retaining tab 30 which is adapted to cooperate with a photovoltaic panel carried by a first plate 10, and a second retaining tab 32 which is adapted to cooperate with a photovoltaic panel carried by a second plate 10.

In case of pressure exerted on the photovoltaic panels, pressure due to the wind for example, the panels can transmit a compression force with a vertical component on the interlocking means 14.

In order to inhibit the crushing of the interlocking means 14, the support plate 10 is equipped with a reinforcement 34 which is interposed between the lateral interlocking means 14 and the roof.

A crushing of the interlocking means 14 is to be avoided because it would risk to open a water infiltration passage, for example by deformation of the hole of passage of the screw 28, or by a lifting of the second profile 24.

The reinforcement 34 is an insert which is arranged in the cavity delimited by the first profile 22 of the interlocking means 14 to oppose the crushing of the interlocking means 14.

In a non limiting manner, the reinforcement 34 may also be integrated and formed by the first profile 22, for example during the molding of the first profile 22.

According to another aspect, with reference to FIGS. 1 and 2, the support plate 10 includes positioning blocks 36 of the photovoltaic panel which allow the positioning, the guiding, the wedging of the photovoltaic panel and the support of the feet of the panels installers.

Furthermore, each positioning block 36 is associated with a piercing area 38 which is arranged downstream of the positioning blocks 36 to be protected from the water flow and which is raised so as to avoid the water penetration.

The piercing area 38 means an area which is designed to allow the piercing and the passage of fastening means. The piercing area 38 may include a print or a mark indicating a piercing location, and/or a mechanically pre-weakened area to promote the piercing for example.

As it can be seen in FIG. 2, each piercing area 38 is less raised than the associated positioning block 36 in order to allow the arrangement of fastening means, such as screws (not shown), without these fastenings means going beyond the associated positioning block 36 not to hamper the installation of the photovoltaic panel.

Also, the support plate 10 delimits a recess 40 for the passage of the cables and the access to the framework of the roof.

The recess 40 is topped by a bead 42 which is disposed so as to inhibit the flow of water coming from the ridge of the roof in the recess 40.

More particularly, the bead 42 has an inverted U shape formed by a first lateral portion 44, a second lateral portion 46 and an upper transverse portion 48.

A groove 50 is formed in the upper portion 48 of the bead 42, allowing the passage of cables between the plate 10 and the photovoltaic panel.

As it can be seen in FIG. 1, the plate 10 comprises a plurality of guide rails 52 which are arranged upstream of the recess 40 along the direction of the water flow coming from the ridge of the roof, and which are arranged in a generally inverted V shape in order to divert the water flow on the lateral sides of the recess 40.

Each guide rail 52 forms a bead raised to divert the water flow on the lateral sides of the recess 40.

Also, the plate 10 comprises raising means 58 of the photovoltaic panel which allow ventilating the photovoltaic panel.

Finally, the plate 10 is provided with wedges 60 which are arranged upstream of the positioning blocks 36, and which allow evacuating the water coming from the ridge of the roof.

Furthermore, the wedges 60 are designed to support the photovoltaic panel.

According to another aspect, the support plate 10 includes a cover 62 which extends in a transverse and vertical plane and which is delimited by a front face 64 which is arranged opposite to the photovoltaic panel and a rear face 66.

The cover 62 is mounted by form-fitting interlocking on the plate 10 so as to obstruct the recess 40.

In a non limiting manner, the cover 62 can be fastened by screwing or gluing or any other adapted means.

Figure 3:
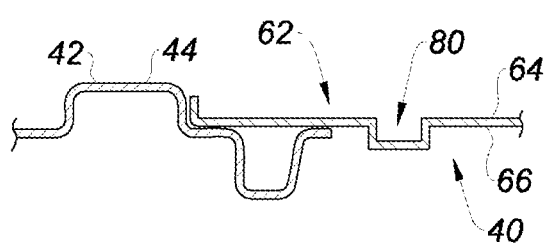
FIG. 3 is a cross-sectional detail view according to the line 3-3 of FIG. 1, which illustrates a lateral edge of the cover of FIG. 1 and the bead of the support plate.

Referring to FIGS. 1 to 3, the cover 62 is delimited by a first lateral edge 68, an opposite second lateral edge 70 and an upper edge 72 which cooperate with the first portion 44, the second lateral portion 46 and the transverse upper portion 48 of the bead 42 respectively, so as to block the cover 62 in an obstruction position of the recess 40.

Figure 5:
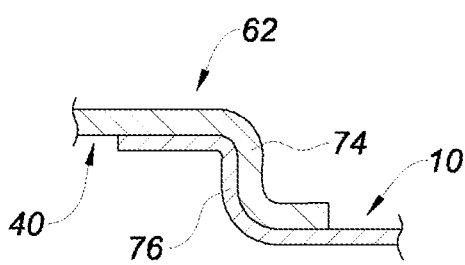
FIG. 5 is a vertical sectional detail view according to the line 5-5 of FIG. 1 which illustrates the lower edge of the cover.

Furthermore, as it can be seen in detail in FIG. 5, the cover 62 is delimited by a step-shaped lower edge 74 which cooperates with a lower edge 76 whose shape is complementary to that of the recess 40.

According to one form, the cover 62 is an insert designed to be mounted on the support plate 10, thanks to which the cover 62 may equip an existing support plate 10.

However, in a non limiting manner, the cover 62 may be made integrally by molding in one piece with the support plate 10.

Similarly, the cover 62 may be secured to the photovoltaic panel, so that the assembly constituted by the cover 62 and the photovoltaic panel is mounted directly in the recess 40 of the plate 10.

Figure 4:
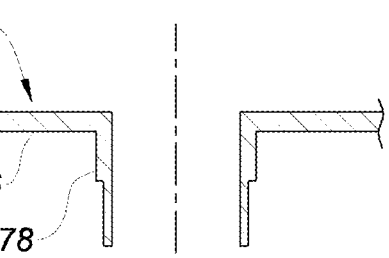
FIG. 4 is a cross-sectional detail view according to the line 4-4 of FIG. 1, which illustrates the mouth for recovery of air from the cover.

According to another aspect of the present disclosure, the cover 62 includes a tubular-shaped mouth 78, shown in detail in FIG. 4, which extends from the rear face 66 of the cover 62 and which is designed to be connected on an extraction or ventilation device (not shown) such as a bypass ventilation device for example.

The mouth 78 is adapted to allow the recovery of the air which is heated by the photovoltaic panel and which is contained between the photovoltaic panel and the front face 64 of the cover 62.

Furthermore, the cover 62 delimits two holes 80 each adapted to allow the passage of cables (not shown), in particular the cables connected to the photovoltaic panel.

Figure 6:
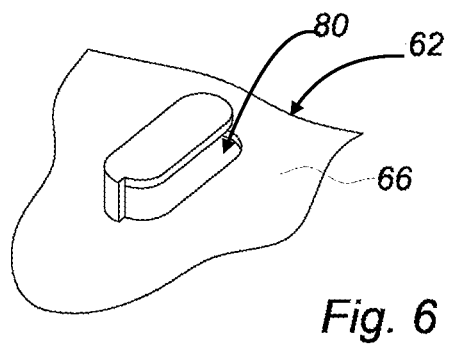
FIG. 6 is a perspective detail view, which illustrates a hole for the passage of cables formed on the cover.

As it can be seen in FIGS. 3 and 6, each hole 80 is associated with a protrusion which extends from the rear face 66 of the cover 62 and which allows guiding the cables passed through the holes 80.

The present description of the disclosure is given by way of non limiting example.

It will be understood that the plate 10 can also be designed and sized to allow a laying in landscape.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A support plate adapted to support a photovoltaic panel and to allow the fastening and the integration of the photovoltaic panel on a building roof, said plate comprising:
    watertight vertical overlap means;
    watertight lateral interlocking means adapted to cooperate with an adjacent plate; and
    raised positioning blocks raised from a front surface of the support plate; and
    a bead raised from the front surface of the support plate and including a first lateral portion, a second lateral portion opposing the first lateral portion, and an upper transverse portion;
    a cover forming a central portion of the support plate and disposed inside a perimeter of the bead such that a front surface of the cover is lower than a front surface of the bead, said cover being disposed between the front surface of the support plate and the photovoltaic panel and including a mouth defining an opening and a tubular wall, wherein the tubular wall of the mouth surrounds the opening, protrudes from a rear face of the cover toward a front surface of the support plate and is configured to engage an air extraction device to allow recovery of air interposed between the photovoltaic panel and the front surface of the cover, the cover further defining at least one hole separate from the opening of the mouth to allow passage of cables connected to the photovoltaic panel; and
    a recess for passage of the cables and access to framework of the building roof, wherein the cover is an insert adapted to obstruct the recess,
    wherein the cover is adapted to be mounted by form-fitting interlocking on the plate, the cover including a first lateral edge, a second lateral edge opposing the first lateral edge, and an upper edge, which cooperate with the first lateral portion, the second lateral portion and the transverse upper portion of the bead, respectively, so as to block the cover in an obstruction position of the recess, the cover further defining a step-shaped lower edge which cooperates with a lower edge of the recess and whose shape is complementary to the lower edge of the recess.

2. The support plate according to claim 1, wherein the bead is configured to inhibit a flow of water coming from a ridge of the building roof in the recess.

3. The support plate according to claim 1, further comprising a plurality of guide rails arranged upstream of the recess along a direction of the water flow coming from a ridge of the building roof, the plurality of guide rails being arranged in an inverted V shape to divert the water flow on lateral sides of the recess.

4. The support plate according to claim 1, wherein the cover further comprises a protrusion extending from the rear face of the cover and proximate the at least one hole for guiding the cables passing through the at least one hole.

5. The support plate according to claim 1, further comprising at least one reinforcement interposed between the lateral interlocking means and the building roof and which is designed to inhibit crushing of said lateral interlocking means.

6. An assembly formed by a photovoltaic panel and a support plate according to claim 1.

\* \* \* \* \*